UNITED STATES PATENT OFFICE 2,653,148

CUPRIFEROUS TRISAZO DYESTUFFS

Fritz Kehrer, Basel, Switzerland, assignor to Sandoz A. G., Basel, Switzerland, a Swiss firm No Drawing. Application August 7, 1950, Serial No. 178,174. In Switzerland August 15, 1949

6 Claims. (Cl. 260—145)

The present invention relates to copper-containing trisazo dyestuffs and to the preparation thereof.

It has been found that valuable copper-containing trisazo dyestuffs are obtained by allowing 1 mol of 5,5'-dihydroxy-2,2'-dinaphthylamine-7,7'-disulfonic acid, 1 mol of tetrazotized 3,3'-dimethoxy-4,4'-diaminodiphenyl, 1 mol of a hydroxynaphthalene-sulfonic acid which corresponds to the formula

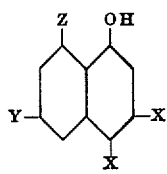

wherein one X is an SO₃H group and the other X is a hydrogen atom, Y and Z each stands for an SO₃H group or a hydrogen atom, and 1 mol of the diazo compound of an aniline derivative which corresponds to the formula

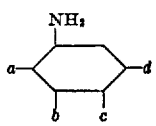

wherein $a$ = OH, OCH₃ or COOH,
$b$ = H, NO₂, halogen, alkyl or SO₃H,
$c$ = H, NO₂ or SO₃H, and
$d$ = H, NO₂, halogen, alkyl, OCH₃, SO₃H, SO₂NH₂, SO₂NH-alkyl or SO₂NH-phenyl, to react with each other in such manner that the tetrazotized 3,3'-dimethoxy-4,4'-diaminodiphenyl is attached, on the one hand, to the 2-position of the hydroxynaphthalene-sulfonic acid and, on the other hand, to the 6-position of the 5,5'-dihydroxy-2,2'-dinaphthylamine - 7,7' - disulfonic acid, and then subjecting the obtained dyestuff to a demethoxylating coppering. The resultant new dyestuffs are copper complex compounds of the trisazo dyestuffs which correspond to the formula

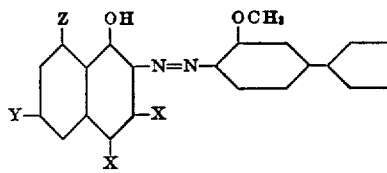

wherein X, Y, Z, $a$, $b$, $c$ and $d$ have the afore-indicated significances. The total number of SO₃H groups present must be at least four.

More specifically, the new dyestuffs can be obtained (1) by coupling the intermediate obtained from 1 mol of tetrazotized 3,3'-dimethoxy-4,4'-diaminodiphenyl and 1 mol of a hydroxynaphthalene-sulfonic acid with 1 mol of 5,5'-dihydroxy-2,2'-dinaphthylamine-7,7'-disulfonic acid and then preparing the trisazo dyestuff by adding on 1 mol of a diazotized aniline derivative, or (2) first preparing the monoazo dyestuff from 1 mol of a diazotized aniline derivative and 1 mol of 5,5'-dihydroxy-2,2'-dinaphthylamine-7,7' - disulfonic acid and then combining this dyestuff with the intermediate obtained from 1 mol of tetrazotized 3,3'-dimethoxy - 4,4' - diaminodiphenyl and 1 mol of a hydroxynaphthalene-sulfonic acid, or (3) combining the intermediate obtained from 1 mol of tetrazotized 3,3'-dimethoxy-4,4'-diaminodiphenyl and 1 mol of 5,5'-dihydroxy-2,2'-dinaphthylamine-7,7'-disulfonic acid with 1 mol of a hydroxynaphthalene-sulfonic acid and coupling the product with a diazotized aniline derivative—and in each case subjecting the obtained trisazo dyestuff to the demethoxylating coppering. This coppering, to produce the copper complex, may be effected by any method wherein the metallization takes place with splitting of the methoxy groups; see for example U. S. Patent No. 2,437,699.

The new dyestuffs dye cotton and regenerated cellulose in brilliant blue shades of very good fastness to light and washing. Compared to the closest prior art comparable dyestuff:

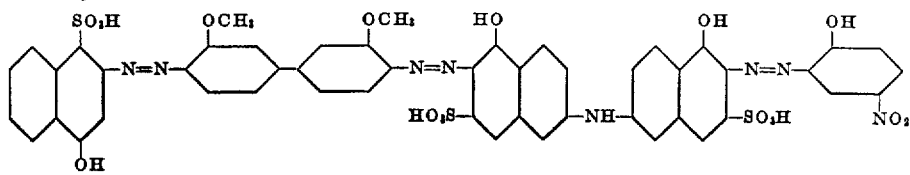

(see French patent of Addition No. 20,186 to French Patent No. 481,190, Group II, Type XIII, Example 3, page 22), the dyestuffs of the present invention are characterized by superior fastness to washing and light. The dyestuff of the French patent contains only three sulfonic acid groups in the molecule. Its preparation is characterized by the fact that the conversion of the uncoppered dyestuff into the copper complex compound is effected by means of a conventional-non-demethoxylating coppering method. But even if the dyestuff of the French patent is subjected to a demethoxylating coppering, the obtained copper complex is still inferior to the new dyestuffs of the present invention.

The latter contain at least four sulfonic acid groups. Notwithstanding the fact that they are thus of better solubility than the product described in the aforesaid French patent of addition, they are nevertheless unexpectedly characterized by enhanced fastness to washing. Metallization according to the present invention is carried out according to demethoxylating coppering methods, and the resulting products give dyeings which are faster to light than those of the dyestuff of the French patent of addition.

Illustrative of naphthol-sulfonic acids which may be used according to the present invention are 1-hydroxynaphthalene-3-sulfonic acid, 1-hydroxynaphthalene-4-sulfonic acid, 1-hydroxynaphthalene-3,8-disulfonic acid, 1-hydroxynaphthalene-3,6-disulfonic acid, 1-hydroxynaphthalene-4,8-disulfonic acid, 1-hydroxynaphthalene-3,6,8-trisulfonic acid, etc. If use is made, as coupling component, of a hydroxynaphthalene-monosulfonic acid, the aniline derivative employed for further coupling must contain at least one sulfonic acid group, in order that the end product may contain at least 4 sulfonic acid groups in the molecule.

Illustrative of aniline derivatives which may be used according to the present invention are 4-nitro-2-amino-1-hydroxybenzene, 4-chloro-2-amino-1-methoxy-benzene, 5-nitro-2-amino-1-hydroxy-benzene, 5-nitro-4-chloro-2-amino-1-hydroxybenzene, 6-nitro-4-chloro-2-amino-1-hydroxy-benzene, 6-methyl-4-nitro-2-amino-1-hydroxybenzene, 6-nitro-4-methyl-2-amino-1-hydroxybenzene, 5-nitro-4-methyl-2-amino-1-hydroxybenzene, 4,6-dinitro-2-amino-1-hydroxybenzene, 5-nitro-2-amino-benzoic acid, 4-methoxy-2-amino-benzoic acid, 4-nitro-2-amino-1-hydroxybenzene-6-sulfonic acid, 6-nitro-2-amino-1-hydroxybenzene-4-sulfonic acid, 2-amino-1-hydroxybenzene-4-sulfonic acid, 2-amino-1-methoxybenzene-4-sulfonic acid, 4-chloro-2-amino-1-hydroxybenzene-6-sulfonic acid, 6-chloro-2-amino-1-hydroxybenzene-4-sulfonic acid, 4-chloro-2-amino-1-hydroxybenzene-5-sulfonic acid, 2-amino-1-hydroxybenzene-4-sulfonic acid amide, 2-amino-1-methoxy-4-sulfonic acid amide, 2-amino-1-hydroxybenzene-4-sulfonic acid methylamide, 2-amino-1-hydroxybenzene-4-sulfonic acid ethylamide, 2-amino-1-hydroxybenzene-4-sulfonic acid anilide, etc.

The following examples further illustrate the invention, but are not intended to be limitative thereof. The parts are by weight.

Example 1

24.4 parts of 3,3'-dimethoxy-4,4'-diamino-diphenyl are tetrazotized in the usual way and, while cooling with ice, are then combined with 38.4 parts of 1-hydroxynaphthalene-3,6,8-trisulfonic acid in the presence of sodium carbonate. The obtained intermediate is then coupled with 46.1 parts of 5,5'-dihydroxy-2,2'-dinaphthyl-amine-7,7'-disulfonic acid in a medium alkaline with sodium carbonate. The resultant disazo dyestuff is filtered off, dissolved in water with addition of sodium carbonate, and combined in the presence of a 5-10% by volume pyridine base mixture with the conventionally prepared diazo compound from 18.8 parts of 5-nitro-4-chloro-2-amino-1-hydroxybenzene. The isolated trisazo dyestuff thus prepared, which corresponds to the formula

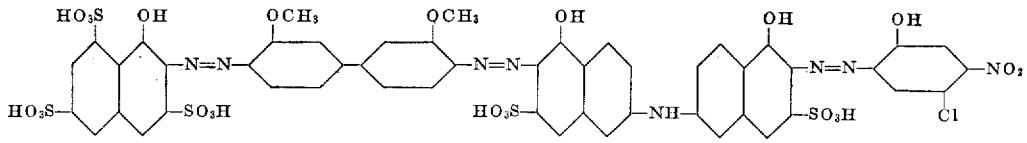

is converted, in per se known manner with copper oxide-ammonia solution, into the copper complex compound. However, this conversion may be effected with any other demethoxylating coppering method, the same end product being obtained.

The copper complex dyes cotton and regenerated cellulose in brilliant blue shades of very good fastness to light and washing.

The identical dyestuff is obtained, by first preparing the monoazo dyestuff from 1 mol of the diazo compound from 5-nitro-4-chloro-2-amino-1-hydroxybenzene and 1 mol of 5,5'-dihydroxy-2,2'-dinaphthylamine-7,7'-disulfonic acid, and then combining this dyestuff with the intermediate from 1 mol of tetrazotized 3,3'-dimethoxy-4,4'-diamino-diphenyl and 1 mol of 1-hydroxynaphthalene-3,6,8-trisulfonic acid, or by combining the intermediate from 1 mol of tetrazotized 3,3'-dimethoxy-4,4'-diamino-diphenyl and 1 mol of 5,5'-dihydroxy-2,2'-dinaphthylamine-7,7'-disulfonic acid with 1 mol of 1-hydroxynaphthalene-3,6,8-trisulfonic acid and then coupling with 1 mol of diazotized 5-nitro-4-chloro-2-amino-1-hydroxybenzene, and subjecting the obtained trisazo dyestuff to demethoxylating coppering.

Example 2

24.4 parts of 3,3'-dimethoxy-4,4'-diamino-diphenyl are diazotized in conventional manner and, while cooling with ice, combined with 30.4 parts of 1-hydroxynaphthalene-3,8-disulfonic acid in the presence of sodium carbonate. The resultant intermediate is combined, in the presence of excess sodium carbonate and of 5-10 vol. % pyridine base mixture, with a solution of 66.0 parts of the monoazo dyestuff from diazotized 6-nitro-4-chloro-2-amino-1-hydroxybenzene and 5,5' - dihydroxy-2,2'-dinaphthylamine-7,7'-disulfonic acid, the coupling of which has been effected in a medium alkaline with sodium bicarbonate.

The isolated resultant trisazo dyestuff—which corresponds to the formula

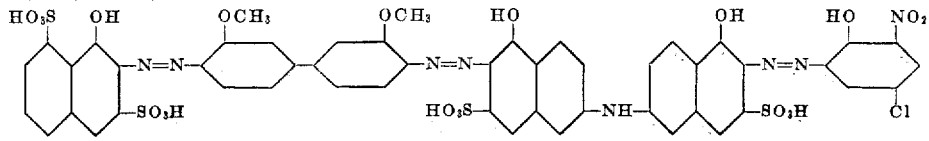

is converted, in per se known manner with copper oxide-ammonia solution, into the copper complex compound.

The copper complex dyes cotton and regenerated cellulose in brilliant blue shades of very good fastness to light and washing.

Example 3

24.4 parts of 3,3'-dimethoxy-4,4'-diaminodiphenyl are tetrazotized in the usual way and, while cooling with ice, are combined with 46.1 parts of 5,5'-dihydroxy-2,2'-dinaphthylamine-7,7'-disulfonic acid in the presence of sodium bicarbonate. After formation of the intermediate, it is coupled—in a medium rendered alkaline with sodium carbonate—with 30.4 parts of 1-hydroxynaphthalene-3,8-disulfonic acid. The resultant disazo dyestuff is filtered off, dissolved in water and sodium carbonate, and combined in the presence of 5-10 volume per cent pyridine base mixture with the conventionally-prepared diazo compound from 4-nitro-2-amino-1-hydroxy-benzene.

The isolated trisazo dyestuff, which corresponds to the formula

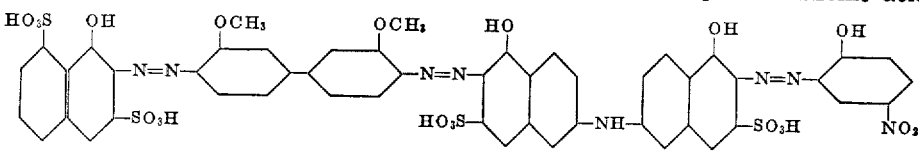

is then converted, in the usual way with copper oxide-ammonia solution, into the copper complex compound.

The copper complex dyes cotton and regenerated cellulose in brilliant blue shades of very good fastness to light and washing.

Example 4

24.4 parts of 3,3'-dimethoxy-4,4'-diaminodiphenyl are tetrazotized in the conventional manner and, while cooling with ice, combined with 30.4 parts of 1-hydroxynaphthalene-3,6-disulfonic acid in the presence of sodium carbonate. The resultant intermediate is coupled, in a medium rendered alkaline with sodium carbonate, with 46.1 parts of 5,5'-dihydroxy-2,2'-dinaphthylamine-7,7'-disulfonic acid. The thus-prepared disazo dyestuff is filtered off, dissolved in water and sodium carbonate, and combined in the presence of 5-10 volume per cent pyridine base mixture with the conventionally-prepared diazo compound from 23.4 parts of 4 - nitro - 2 - amino - 1 - hydroxybenzene - 6 - sulfonic acid.

The resultant trisazo dyestuff of the formula

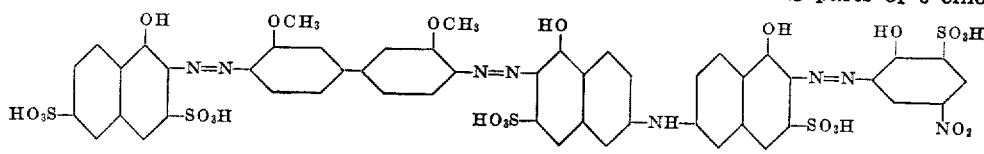

is isolated and converted, in the usual manner with copper oxide-ammonia solution, into the copper complex compound.

The copper complex dyes cotton and regenerated cellulose in brilliant blue shades of very good fastness to light and washing.

Example 5

24.4 parts of 3,3'-dimethoxy-4,4'-diaminodiphenyl are tetrazotized in the usual manner and, while cooling with ice, combined with 38.4 parts of 1-hydroxynaphthalene-3,6,8-trisulfonic acid in the presence of sodium carbonate. The resultant intermediate is coupled, in a medium rendered alkaline with sodium carbonate, with 46.1 parts of 5,5'-dihydroxy-2,2'-dinaphthylamine-7,7'-disulfonic acid. The thus-obtained disazo dyestuff is filtered off, dissolved in water and sodium carbonate, and combined in the presence of 5-10 volume per cent pyridine base mixture with the conventionally-prepared diazo compound from 16.7 parts of 4-methoxy-2-aminobenzoic acid.

The resultant trisazo dyestuff of the formula

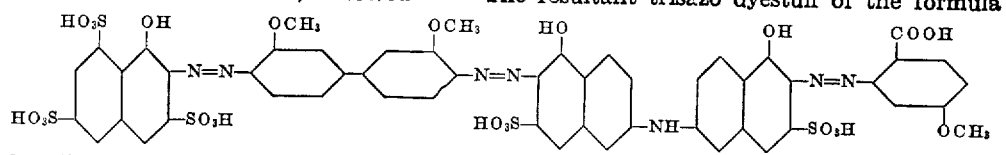

is isolated and converted, in the usual manner with copper oxide-ammonia solution, into the copper complex compound.

This copper complex dyes cotton and regenerated cellulose in brilliant blue shades of very good fastness to light and washing.

The naphthol-sulfonic acids employed in the preceding examples may be replaced in each case by, for example, 22.4 parts of 1-hydroxynaphthalene-3-sulfonic acid, 22.4 parts of 1-hydroxynaphthalene-4-sulfonic acid, or 30.4 parts of 1-hydroxynaphthalene-4,8-disulfonic acid, etc., whereby, while otherwise proceeding as described in the respective examples, dyestuffs with similar properties are obtained.

Similarly, the aniline derivatives employed in the preceding examples may be replaced in each case by, for example, 15.7 parts of 4-chloro-2-amino-1-methoxybenzene or 15.4 parts of 5-nitro-2-amino-1-hydroxybenzene or 16.8 parts of 6-methyl-4-nitro-2-amino-1-hydroxybenzene or 16.8 parts of 6-nitro-4-methyl-2-amino-1-hydroxy-benzene or 16.8 parts of 5-nitro-4-methyl-2-amino-1-hydroxybenzene or 19.9 parts of 4,6-dinitro-2-amino-1-hydroxybenzene or 18.2 parts of 5-nitro-2-amino-benzoic acid or 23.4 parts of 6 - nitro - 2 - amino - 1 - hydroxybenzene - 4 - sulfonic acid or 18.9 parts of 2-amino-1-hydroxybenzene-4-sulfonic acid or 20.3 parts of 2-amino-1-methoxybenzene-4-sulfonic acid or 22.3 parts of 4-chloro-2-amino-1-hydroxybenzene-6-sulfonic acid or 22.3 parts of 6-chloro-2-amino-1-hydroxybenzene-4-sulfonic acid or 22.3 parts of 4 - chloro - 2 - amino - 1 - hydroxybenzene - 5 - sulfonic acid or 18.8 parts of 2-amino-1-hydroxybenzene-4-sulfonic acid amide or 20.2 parts of 2 - amino - 1 - methoxybenzene - 4 - sulfonic acid amide or 20.2 parts of 2-amino-1-hydroxybenzene-4-sulfonic acid methylamide or 21.6 parts of 2-amino-1-hydroxybenzene-4-sulfonic acid ethylamide, or 26.4 parts of 2-amino-1-hydroxybenzene-sulfonic acid aniline, etc., whereby, while otherwise proceeding as described in the respective examples, dyestuffs with similar properties are obtained.

Both the naphthol-sulfonic acids and the

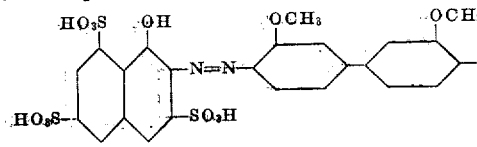

aniline derivatives employed in the preceding examples may be replaced by the corresponding alternatives above-enumerated and while otherwise proceeding as described in the examples, and

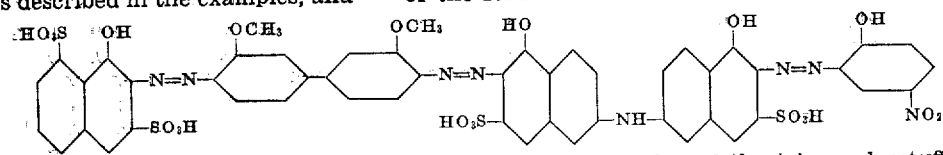

dyestuffs with similar properties will again be obtained.

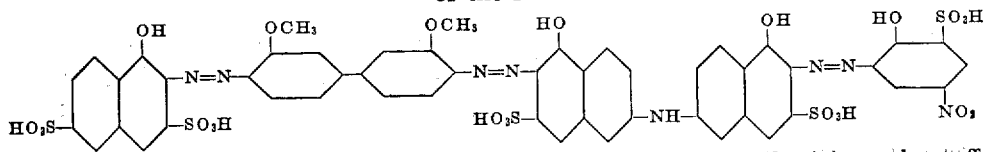

Having thus disclosed the invention what is claimed is:

1. A copper complex compound of a trisazo dyestuff of the formula

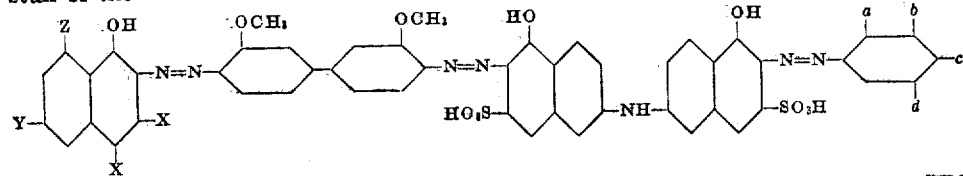

wherein one X stands for $SO_3H$ and the other X for hydrogen, Y and Z each stands for a member selected from the group consisting of $SO_3H$ and hydrogen, $a$ stands for a member selected from the group consisting of OH, $OCH_3$, and COOH, $b$ stands for a member selected from the group consisting of hydrogen, $NO_2$, halogen, lower alkyl and $SO_3H$, $c$ stands for a member selected from the group consisting of hydrogen, $NO_2$ and $SO_3H$, and $d$ stands for a member selected from the group consisting of hydrogen, $NO_2$, halogen, lower alkyl, $OCH_3$, $SO_3H$, $SO_2NH_2$, $SO_2NH$-lower alkyl and $SO_2NH$-phenyl, and wherein the total number of $SO_3H$ groups is at least four.

2. The copper complex of the trisazo dyestuff of the formula

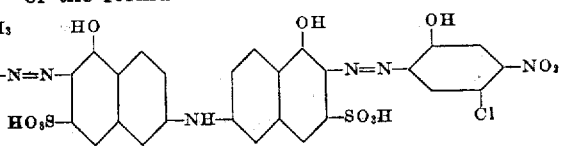

3. The copper complex of the trisazo dyestuff of the formula

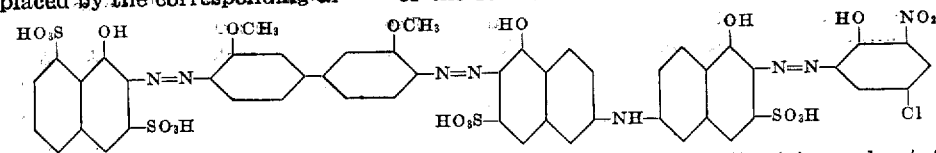

4. The copper complex of the trisazo dyestuff of the formula

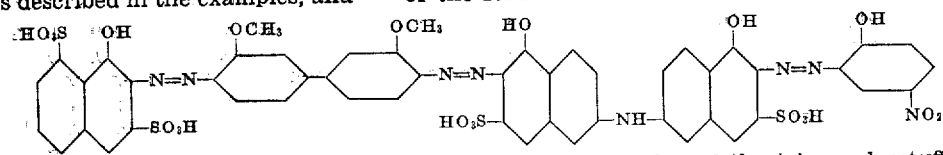

5. The copper complex of the trisazo dyestuff of the formula

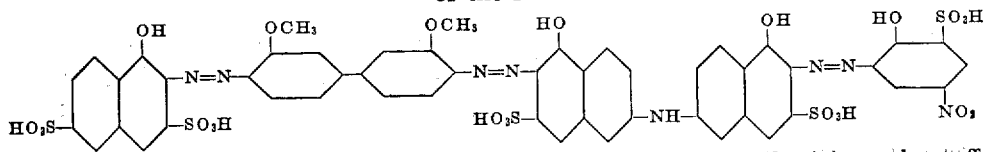

6. The copper complex of the trisazo dyestuff of the formula

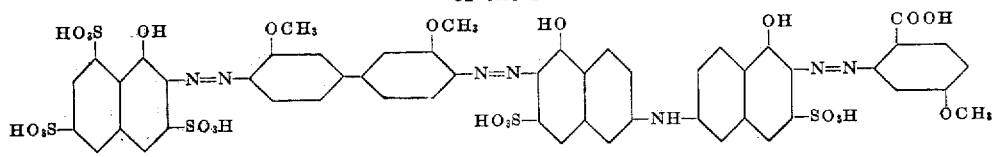

FRITZ KEHRER.

References Cited in the file of this patent

UNITED STATES PATENTS

| Number | Name | Date |
|---|---|---|
| 482,106 | Ulrich et al. | Sept. 6, 1892 |
| 1,871,477 | Straub et al. | Aug. 16, 1932 |
| 2,370,500 | Sparks | Feb. 27, 1945 |
| 2,459,467 | Straub et al. | Jan. 18, 1949 |

FOREIGN PATENTS

| Number | Country | Date |
|---|---|---|
| 481,190 | France | Aug. 19, 1916 |
| 20,186 | France | Oct. 3, 1916 |
| | 1st addition to No. 481,190 | |

Certificate of Correction

Patent No. 2,653,148 September 22, 1953

FRITZ KEHRER

It is hereby certified that error appears in the printed specification of the above numbered patent requiring correction as follows:

Column 7, line 4, for "aniline" read *anilide*;

and that the said Letters Patent should be read as corrected above, so that the same may conform to the record of the case in the Patent Office.

Signed and sealed this 10th day of November, A. D. 1953.

[SEAL]

ARTHUR W. CROCKER,
*Assistant Commissioner of Patents.*